July 30, 1929.  O. S. WRIGHT  1,722,728
LOCK
Filed March 15, 1928  2 Sheets-Sheet 1
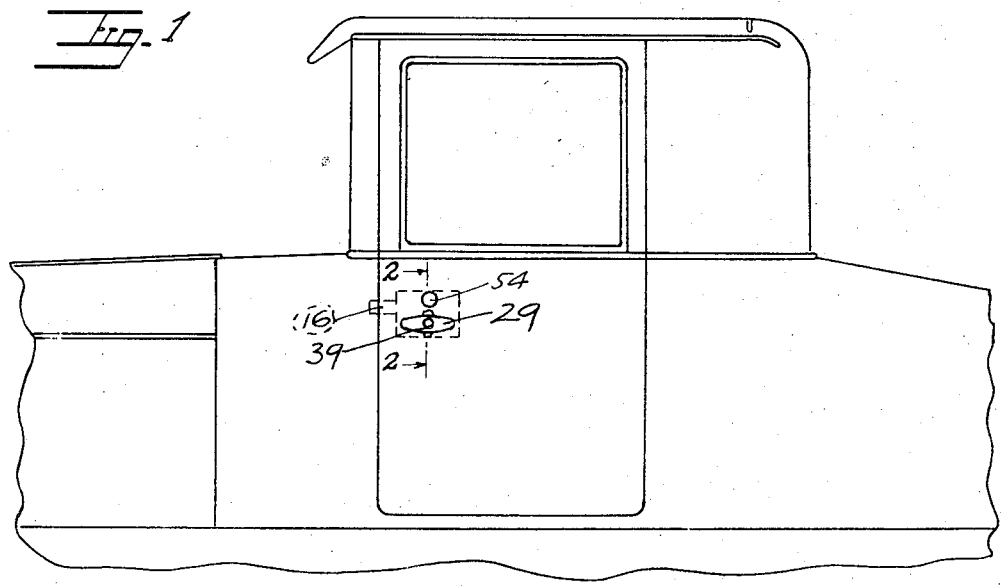
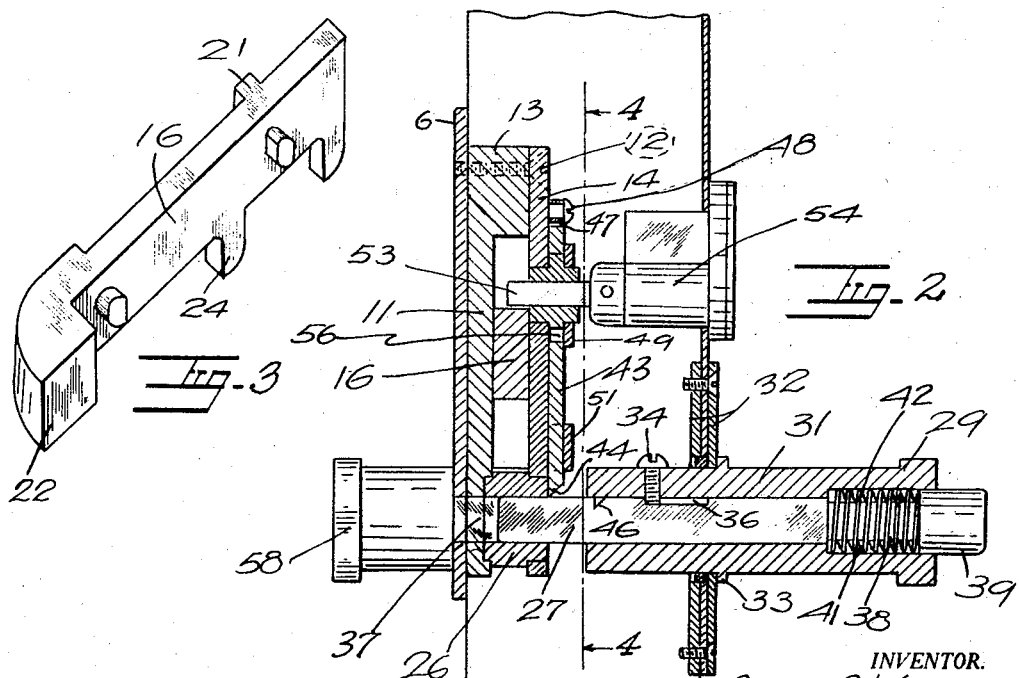
INVENTOR.
OWEN S. WRIGHT.
BY Harry C. Schroeder
ATTORNEY July 30, 1929.  O. S. WRIGHT  1,722,728

LOCK

Filed March 15, 1928   2 Sheets-Sheet 2

INVENTOR.
OWEN S. WRIGHT.
BY
ATTORNEY

Patented July 30, 1929.

1,722,728

UNITED STATES PATENT OFFICE.

OWEN S. WRIGHT, OF BERKELEY, CALIFORNIA.

LOCK.

Application filed March 15, 1928. Serial No. 261,731.

The invention forming the subject matter of this application relates to door locks.

In the type of door lock used at present on automobile doors, it is necessary to use a key when locking the door, just as well as when opening the door. Due to the inconvenience of using a key for locking the door, the majority of the automobile drivers leave the doors unlocked when leaving the car for a short time. There is no objection or inconvenience in using a key for unlocking the automobile door because of the fact that the key may be selected and be in readiness for use while the driver or the owner of the vehicle is approaching the automobile. The same is true in the case of any other type of vehicle, such as airplanes, and the like.

The primary object of the invention is the provision of a door lock for vehicles in which means are provided for locking the door without the use of a key, but which cannot be unlocked unless the key is used.

Another object of the invention is the provision of a lock for vehicles in which the door may be locked by merely depressing a button so as to prevent the turning of the outside door knob. While the mere turning of the door knob from the inside opens the door without the use of a key.

A still further object of the invention is to provide a safe door lock for vehicles which may be readily attached to any standard type of vehicle door and which is highly useful and simple in construction. Convenience of arrangement, lightness, and comparative inexpense of manufacture are further objects which have been borne in mind in the production and development of the invention.

With the foregoing and other objects in view, my invention resides in the combination and arrangement of parts and in the details of construction hereinafter described and claimed, it being understood that changes in the precise embodiment of the invention, hereinafter disclosed, may be made within the scope of the appended claims without departing from the spirit of the invention.

The invention is clearly illustrated in the accompanying drawings, in which—

Figure 1 is the outline view of an automobile showing the lock attached to the door thereof;

Figure 2 is a sectional view of the lock taken on the line 2—2 of Figure 1;

Figure 3 is a detail view of the lock bolt used in the lock;

Figure 4:
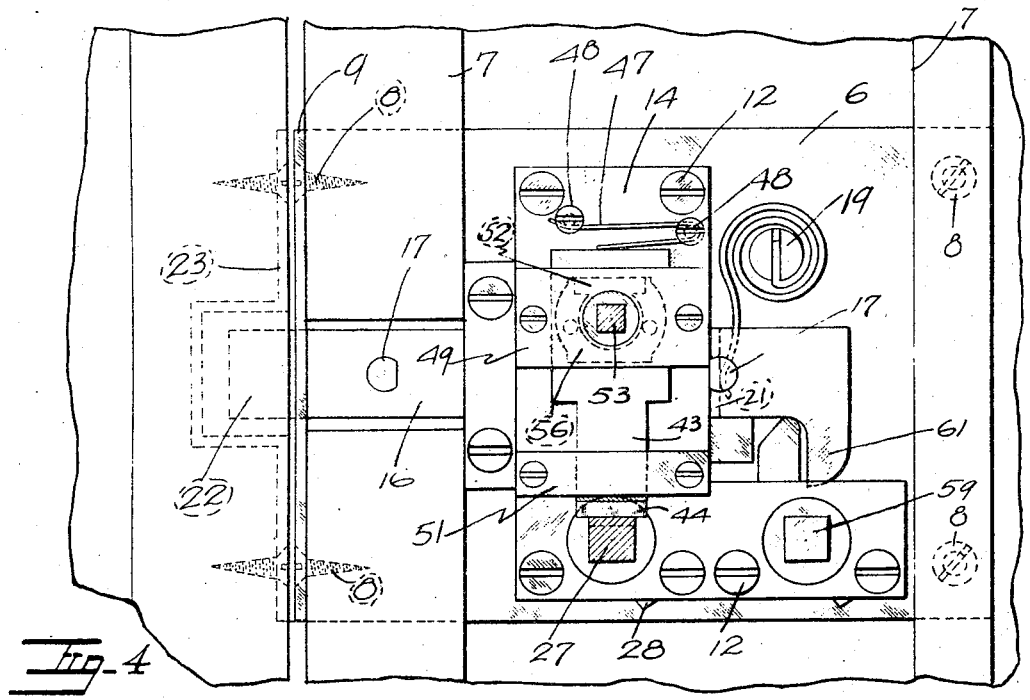
Figure 4 is a sectional view of the lock, the section being taken along the line 4—4 of Figure 2.

Referring to the accompanying drawings, wherein similar reference characters designate similar parts thruout, the various figures described above adequately illustrate my invention, and the following detailed description is commensurate with the above mentioned drawings in enabling an artisan to construct and assemble the constituent parts of the same.

In carrying out my invention, I make use of a plate denoted by the numeral 6 which is fixedly secured to the frame work of a door 7 by means of screws 8. The edge of the plate 6 adjacent to the edge of the door is rebent so as to form a flange 9. A base 11 is secured upon the plate 6 by means of screws 12, said base having a boss 13 extending from the uppermost end thereof, in order to space a guide plate 14 therefrom, said guide plate 14 being secured to the base 11 by means of the screws 12. A lock bolt 16 is slidable between the base 11 and the guide plate 14, said lock bolt having stops 17 thereon abutting against the edges of the guide plate 14 for limiting the lateral movement of the lock bolt. The lock bolt 16 is held in locked position by means of a spiral spring 18 secured in a pin 19 on the plate 6, the free end of said spiral spring 19 engaging a lug 21 on the adjacent side of the lock bolt 16. The end 22 of the lock bolt 16 is of the usual design so as to engage a keeper plate 23 which latter is fixedly secured to the automobile frame opposite to the flange 9.

Figure 5:
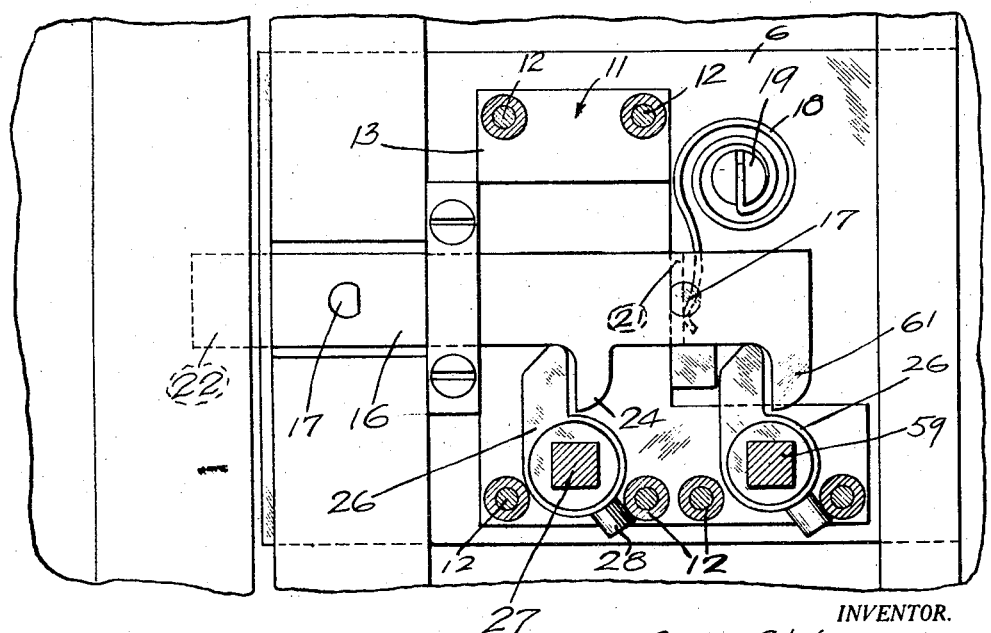
Figure 5 is a sectional front view of the lock showing the cooperation between the lock bolt and the cams on the shaft of the knob.

In order to move the lock bolt 16 against the action of the spiral spring 19, the same is provided with a lug 24 extending downwardly therefrom. A cam 26 on a square shaft 27 is so disposed as to engage the lug 24 when rotated in a clockwise direction, as looking at Figure 5, and thus causing the lock bolt 16 to move against the action of the spiral spring 18 and out of engagement with the keeper plate 23. The turning movement of the cam 26 is limited by a prong 28 abutting against the adjacent screws 12, which latter are used to secure the guide plate 14 to the base 11. The thickness of the cam 26 and lock bar 16 is the same as the height of the boss 13, so that the same are slidable between the guide plate 14 and the base 11. The square shaft 27 is slidable in the cam 26. A door knob 29, having a cylindrical member 31 extending therefrom, is rotatably supported in bearing plates 32 which are fixedly secured to the outside wall of the door. Annular flanges 33 on the opposite sides of the plates 32 prevent the withdrawal of the door knob 29 from the door. The square shaft 27 is also slidable in the door knob 29, but it is caused to rotate therewith.

A set screw 34 is threaded into the wall of the cylindrical member 31 and extends into a slot 36 in the square shaft 27. The slot 36 therefore limits the sliding of the square shaft 27 thru the cam 26. When the square shaft 27 is moved thru the cam 26 toward the base 11, it is brought into engagement with a square hole 37 in the fixed base 13 and when in this position, it is prevented from rotating. A reduced neck 38 upon the square shaft 37 terminates in a large head 39, which latter is slidable in a socket 41 in said door knob. A tension spring 42 bearing against the shoulder of the socket 41 forces the button 39 outwardly from the door knob 29, this movement being limited by the length of the slot 36 in cooperation with the set screw 34.

When it is desired to lock the door so that the knob 29 is prevented from being turned, by exerting pressure on the button 39, the square shaft is advanced into the square hole 37 in the base 13. In order to hold the square shaft 27 in this locked position, I make use of a slider 43 having a wedge-shaped end 44 thereon, which is brought into engagement with a complementary wedge-shaped slot 46 on the square shaft 27. The slider 43 is pressed downwardly by means of a leaf spring 47 bent around a pin 48 secured in the guide plate 14. The slider 43 is guided in its movement by strips 49 and 51 extending across the plate and being fixedly secured to the guide plate 14. The disengaging upward movement of the slider 43 is accomplished by means of a cam 52 on a square bolt 53 of a suitable tumbler lock 54. It is to be noted that the insertion of the key in the tumbler lock 54 and the turning of the same rotates the square bolt 53 and the cam 52 therewith, the edge of the cam 52 engaging the corresponding edge of a hole 56 in the slider 43 in which the cam is disposed, thereby raising the slider 43 against the action of the leaf spring 47 and out of engagement with the wedge-slot 46. When the square shaft 27 is thus released, the action of the tension spring 42 causes the square shaft 27 to slide until the opposite end of the slot 36 abuts against the set screw 34. By this time, the end of the square shaft 27 is withdrawn from the square hole 37 in the base plate 11.

The device is compact and is disposed between the opposite walls of a door completely covered thereby. In order to permit the opening of the locked door from the inside of the vehicle without the use of a key, an inside knob 58 turns a square shaft 59 on which is carried another cam similar to cam 26. The shaft 59 is substantially parallel with the first square shaft 27, but the shaft 59 is not slidable in the cam 26 and is disposed at one side of the locking mechanism, approximately opposite to the location of the spiral spring 18, as it is clearly shown in Figures 4 and 5. At the end of the lock bar 16, adjacent to the square shaft 59, is a second depending lug 61 opposite to the cam 26 and the shaft 59. It is apparent that when it is desired to unlock the door from the inside by turning the knob 58 and the shaft 59 therewith, the cam 26 and the shaft 59 engage the depending lug 61, thereby moving the lock bolt 16 against the action of the spiral spring 18 and withdrawing the end 22 of the lock bar 16 from the lock bolt 23, without in any way affecting the locking of the first square shaft 27.

It will be recognized that in the present compact locking device, the locking of the outside knob 29 against rotation is readily accomplished by pressing the button 39 so that the square shaft 27 is advanced against the action of the spring 38 until the wedge-shaped notch 46 is in alignment with the wedge 44 of the slider 43, in which position the action of the leaf spring 47 will force the wedge 44 into the notch 46 and lock the shaft 27 in place. When the notch 46 is in alignment with the wedge 44, then the square end of the shaft 27 is in engagement with the corresponding square hole 37 in the base 11. Thus, any attempt to turn the knob 29 will merely tend to turn the square end of the shaft 27 in the square hole 39. While the outside knob 29 is locked, the inside knob 58 may be turned in the manner heretofore described so that the door may be readily unlocked from the inside. It is evident that no key is necessary to lock the door when leaving the vehicle. When opening the door from the outside, the standard key is inserted in the tumbler lock 54, and the shaft 53 is turned, thereby causing the cam 52 to raise the locking plate 43 out of the wedge 46 in the manner heretofore described, thus permitting the tension spring 42 to withdraw the square shaft 27 from the square hole 37. Now, the outside knob 29 is free to rotate so that the cam 26 may engage the lock 24, thereby opening the door.

It will be recognized that a particularly compact device is provided which may be readily attached to any door, the locking of which may be readily accomplished without a key. The lock combines safety and light weight with a ruggedness of construction and a positiveness of operation, especially adapting it for its use.

Having thus described my invention, what I now claim as novel and desire to secure by Letters Patent is:

1. In combination a casing, adapted to be secured to a door, a lockbolt slidable therein, a door knob, lockbolt operating means slidable therein, resilient means in said knob for maintaining said operating means in an unlocked position, means slidable in the casing for maintaining said operating means in a locked position, and key operated means for releasing said last slidable locking means.

2. In combination a casing, adapted to be secured to a door, a lockbolt slidable therein, a door knob, lockbolt operating means slidable therein, resilient means in said knob for maintaining said operating means in an unlocked position, resiliently mounted means slidable in the casing for maintaining said operating means in a locked position, and key operated means for releasing said last slidable locking means.

3. In combination a casing adapted to be mounted on a door, a lockbolt slidably supported therein, means in said casing for operating said lockbolt, and means extending outside of said casing for rotating said means; said operating means being resiliently and slidably mounted relative to said rotating means; said casing being adapted to lockingly engage said operating means, when the same is moved in said rotating means into engagement with said casing; and key actuated means for maintaining said operating means in a locked position.

4. In combination a casing adapted to be mounted on a door, a lockbolt slidably supported therein, means rotatable in said casing for operating said lockbolt, and means extending outside of said casing for rotating said means; said operating means being resiliently and slidably mounted relative to said rotating means; said casing being adapted to lockingly engage said operating means, when the same is moved in said rotating means into engagement with said casing; and key actuated means for maintaining said operating means in a locked position, and means extending opposite said key actuated means, for actuating said lockbolt, when said operating means is locked.

5. In combination a casing adapted to be mounted on a door, a lockbolt slidably supported therein, resilient means on said casing for urging said bolt into the locking position, rotatable means for moving said bolt against the action of said resilient means and out of the locking position; means rotating said rotatable means and being slidable therein into a locking engagement with the casing, and resiliently mounted key actuated means for arresting said rotating means in the locked position thereof.

6. In combination a casing adapted to be mounted on a door, a lockbolt slidably supported therein, resilient means on said casing for urging said lockbolt into the locking position thereof, a cam adapted to move said bolt out of locking position against the action of said resilient means, a square shaft slidable in said cam for rotating the same, means for rotating said shaft extending outside of said door, said shaft being resiliently mounted in said rotating means; said casing having a rectangular hole therein complementary to said shaft; and key actuated resiliently mounted means for arresting said shaft when the same is slid into locking engagement with said hole.

7. In combination a casing adapted to be mounted on a door, a lockbolt slidably supported therein, resilient means on said casing for urging said lockbolt into the locking position thereof, a cam adapted to move said bolt out of locking position against the action of said resilient means, a square shaft slidable in said cam for rotating the same, means for rotating said shaft extending outside of said door, said shaft being resiliently mounted in said rotating means; said casing having a rectangular hole therein complementary to said shaft; said shaft having a notch therein, a resiliently mounted lockplate slidable into engagement with said notch when said shaft is in locking engagement with said hole in the casing, and key actuated means for withdrawing said lockplate, thereby releasing said shaft from the locked position.

8. In combination a casing adapted to be mounted on a door, a lock bolt slidably supported therein, means in said casing for operating said lock bolt and means extending outside of said casing for rotating said means, said operating means being resiliently and slidably mounted relative to said rotating means; said casing being adapted to lockingly engage said operating means, when the same is moved into engagement with said casing, a spring actuated slide for retaining said lock bolt in locked position and key actuated means for operating said slide.

In testimony whereof I affix my signature.

OWEN S. WRIGHT.